United States Patent [19]

Parsons et al.

[11] 4,099,259
[45] Jul. 4, 1978

[54] DATA STORES AND DATA STORAGE SYSTEM

[75] Inventors: Robert Parsons, St. Neots; Howard Cook, Renhold, both of England

[73] Assignee: Texas Instruments Incorporated, Dallas, Tex.

[21] Appl. No.: 731,248

[22] Filed: Oct. 12, 1976

[30] Foreign Application Priority Data

Oct. 9, 1975 [GB] United Kingdom ............... 41425/75

[51] Int. Cl.² ............................................. G06F 13/06
[52] U.S. Cl. .................................. 364/900; 365/118; 365/4
[58] Field of Search ....... 340/173 RC, 324 R, 324 M; 364/200 MS File, 900 MS File; 358/102, 188

[56] References Cited

U.S. PATENT DOCUMENTS

| | | | |
|---|---|---|---|
| 3,555,523 | 1/1971 | Sieracki et al. | 340/173 RC |
| 3,706,075 | 12/1972 | Fredrickson et al. | 364/900 |
| 3,735,361 | 5/1973 | Tasso | 364/200 |
| 3,760,382 | 9/1973 | Itoh | 340/173 RC |
| 3,772,658 | 11/1973 | Sarlo | 340/173 RC |
| 3,896,417 | 7/1975 | Beecham | 340/173 RC |
| 3,944,990 | 3/1976 | Chou | 340/173 RC |

OTHER PUBLICATIONS

Gunsagar et al., "A CCD Line Addressable RAM", *IEEE Journal Of Solid-State Circuits*, vol. SC-10, No. 5, Oct. 1975, pp. 268-272.

*Primary Examiner*—Leo H. Boudreau
*Attorney, Agent, or Firm*—Rene' E. Grossman; Richard L. Donaldson; James T. Comfort

[57] ABSTRACT

In a Teletext transmission system, data is transmitted in digital form during lines in the field blanking period of a composite video signal of a television transmission. On reception, the information is decoded and utilized to provide a display comprising a page having a predetermined number of rows of information in alphanumeric or graphics form. The data is received in blocks comprising information digits and each block has an associated group of address digits so that each block can be directed to an appropriate storage location in a first store, regardless of the order in which the data blocks are transmitted. The contents of the first store can then be transferred in address order into a larger capacity serial store ready for use in generating the display. Thus it is possible for a number of pages of information data to be correctly assembled in serial row order, ready for display generation, in a manner accommodating non-transmitted blank rows.

14 Claims, 6 Drawing Figures

DATA STORES AND DATA STORAGE SYSTEM

This invention relates to data stores.

Data stores having random access provide a means of storing and retrieving data with a short access time, since any data may be addressed and the data at any address may therefore be operated on without having to wait for data held at other addresses to be selected first. Serial data stores, in comparison, suffer from the disadvantage that data cannot normally be operated on without waiting for data stored at other addresses. This means that access times are in general longer for serial data stores than for random access data stores.

In a system proposed for transmitting news, weather, and other current information in digital form in the otherwise unused lines between the frames of a television signal and presenting it on a television display, the information is displayed as pages each containing twenty-four rows of forth characters. One such system is disclosed by British patent specification No. 1370535. Rows of characters to be displayed are transmitted between adjacent frames of the television signal and in most cases the order of the rows in the transmission follows the order in which the page would be read. However, any blank rows on a page do not appear as inactive periods during the transmission but the next occupied row is advanced in time to fill the gap. In addition, certain information such as time information which is updated regularly is transmitted at shorter intervals than information which is more static, and results in some transmissions being out of sequence as far as page and/or row numbers are concerned.

The data transmissions occur row by row at a relatively high data rate, which dictates that high speed means for storing and reorganising the transmitted data to page form must be provided at the receiver. The transmitter data includes address data, being provided with page and row address codes, so that an addressable data store would provide one means of storing and reorganising the data, and in the system referred to there would need to be 6720 bits of storage for each page to be stored. A random access memory having a capacity of 6720 bits for each page to be stored would therefore provide a suitable addressable store. However, the data store would be required to be included in a domestic broadcast television receiver and it has been found that the cost of presently available random access memories is likely to be prohibitive for more than a few pages of storage capacity for some time to come. The mean access time of a serial access store is too long for use as a direct replacement for the random access store, although its cost could be much lower.

It is an object of the present invention to provide a low-cost form of addressable data storage suitable for the above application.

According to the invention a multi-address digital data store includes an input circuit for receiving input data comprising a plurality of blocks of information digits each associated with a respective group of two-part address digits, decoding means associated with a plurality of serially accessed registers arranged to store data, each register being independently addressable via an associated respective first switching means to write data into the data store and an associated respective second switching means to read data out of the data store, the first and second means being controllable by means of the decoding means, the two-part address digits forming part of the input data being uniquely related to a preselected register of the data store and being used within the data store to route the input data to the appropriate register of the data store from which the data may be extracted by commands which locate the required register, the two-part address digits consisting of a page identification address part and a row-within-a-page identification address part, each register being adapted to be identified with a preselected page and row-within-a-page address.

The codes which identify each register and relate each register to page and row addresses attached to the incoming data may be manually preselectable to permit changes to be made in the identity of each register. In this way each register may be made to respond to any selected row of data and the selected row may be changed by manually changing the register identification code. If the data store is capable of handling only a single page of data then any one page may be chosen by setting the appropriate codes into each register, and this page may be changed by means of the codes.

The decoding means may be adapted to recognise page and row address codes of the input data and to activate the appropriate ones of the first switching means or the second switching means, and the input circuit routes data either into or out of the data store as appropriate.

Alternatively the decoding means may be an incrementing shift register which activates the appropriate one of the first switching means or the second switching means to open the route to a selected register, and the input circuit performs the additional function of comparing the address codes of the input data with the identity codes of the selected register, and routes the input data into the register or routes data from the register when the address and identity codes are in correspondence.

The input data which comprises a plurality of digits is preferably stored in parallel in each register. Compared with sequential storage this permits data handling at lower clocking rates to achieve comparable access times. For example, a sevenbit word stored in parallel in a register of the data store may be entered or retrieved at one-seventh the clocking rate required for entering or retrieving the same word when stored as seven sequential bits, and the access times will be the same. By using parallel storage in each register, the data store may be implemented with relatively low-speed registers, such as charge-coupled device registers or the like.

A data store having a decoding means adapted to recognise page and row address codes provides random access to any row of a page. Updating information such as time display information can then be entered into the data store as it is transmitted. A data store having an incrementing shift register as the decoding means is less flexible, the storage registers being opened sequentially so that out-of-sequence information such as updating information cannot be accommodated. However, this may not prove a serious drawback in practice since most of the transmitted data is in page and row sequence.

A data store having decoding means adapted to recognise page and row address codes may be a random access memory or a row addressable store with further serial registers to provide storage for a plurality of pages. In such an application the data store accepts the incoming data and organises it into rows of a page in accordance with the input data addresses, and then transfers the page of data into selected serial storage. After transfer, the data store is cleared and made available to receive another page and the process of acceptance, storage in organised form and transfer to another part of the multi-page memory is repeated. The further serial registers may be charge-coupled device registers, magnetic bubble device registers or the like.

Storage for a plurality of pages of transmitted data may be provided by a plurality of data stores acting independently and each programmed to respond to a preselected page of transmitted data.

Keyboard-entered data generated at the receiver may be added to those parts of the data store where register identity information is held. Such keyboard-entered information may include a time code. Some input data may include a time code in addition to the address codes, and data transmitted with a time code may be captured by keying into the data store the appropriate time code, while earlier data with the same address may be ignored.

The data entered into the data store need not be stored by static means, e.g. d.c. coupled flip-flops, since the organisation of the data store permits the data held in each register to be circulated continuously in a loop. Dynamic storage may be employed for holding the rows of data that make up each page. A charge coupled device, for example, is therefore suitable, the feature of parallel storage of the character bits being particularly useful in reducing the speed requirements for handling data to the performance capability of such stores.

The data store may be operated in combination with a display, preferably a raster-scan display such as a television display. The data store organisation is suitable for both data capture and display. In displaying the rows of characters held in the data store each row needs to be circulated a number of times according to the number of lines required to display a character, and the row by row organisation of the store permits this without the need for a buffer store. There may be a need to delay the stored data because of the gap caused by the line blanking period of a raster-scan display. Should the line blanking period exceed the time for which data held in the data store may remain static without deterioration then phantom characters may be inserted to provide a gap between the start and finish of the row. These phantom characters may also serve as a means of ensuring synchronisation of the register contents with the display means.

Data stores in accordance with the invention will now be described by way of example only and with reference to the accompanying drawings in which.

Figure 1:
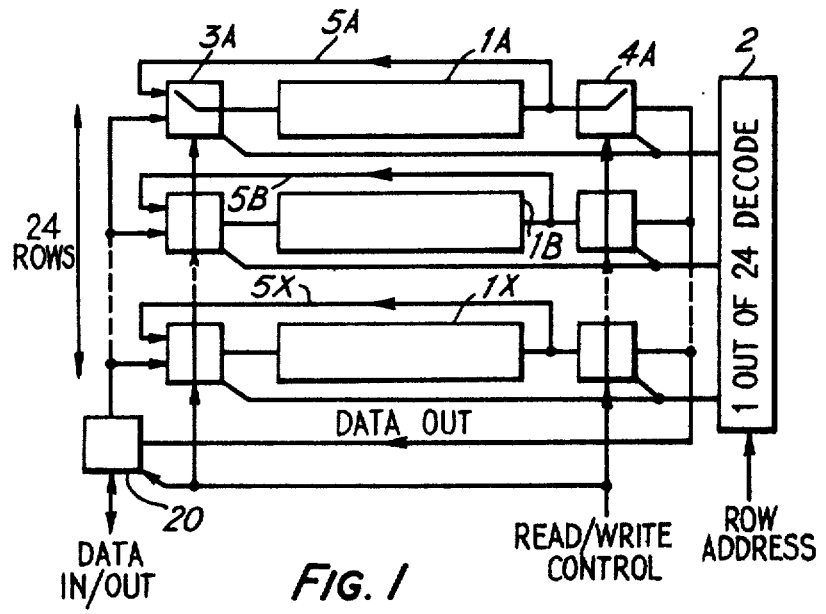
FIG. 1 represents a data store and illustrates three rows of storage capacity, the data store having a decoder as the first switching means.

Referring to FIG. 1, the data store consists of a number of shift registers each of which is associated with one row of data. In a system where there are twenty-four rows of data on a page there will be 24 shift registers provided. In the figure there are three shift registers shown but any number may be provided without disrupting operation. Each register is independently addressable to enter and to extract data, each register being addressed via an address decoder 2. Each of the shift registers 1A, 1B, . . . 1X is capable of storing around forty-one characters each consisting of a seven-bit word. Data held in shift register 1A is circulated continuously around the path provided by connection 5A, and similarly for shift registers 1B . . . 1X, data is circulated around feedback paths 5B . . . 5X respectively. The seven-bit words are stored in parallel in each register to reduce access times, and the registers themselves are preferably charge-coupled device registers which are suitable for operation at the lower clocking frequencies achieved by parallel storage. Other forms of dynamic storage device are also suitable, such as MOS registers.

Data enters the data store by the action of duplexer 20 which is commanded by a READ/WRITE control line. Data enters on seven lines which are common to all the registers. Each register has its own address which corresponds to the row addresses associated with the incoming data, the data row address being decoded by the decoder 2 to open one of inlet gates 3A – 3X to permit the incoming data to enter the appropriate register. Because the register into which data is entered depends on the data address alone, then access to the data store is completely random. All registers remain in the recirculate mode when not addressed by the ROW ADDRESS line and are then independent of the READ/WRITE control line. Each register is associated with an input gate and an output gate. For example, register 1A has associated input gate 3A and associated output gate 4A which respond to commands from the READ/WRITE control line and the address decoder 2 to write data into a register or read data out of the register.

A memory may consist of a plurality of data stores, the memory having a capacity equivalent to the number of pages to be stored where a page of memory is provided by a data store. All the data stores in the memory are connected in parallel to the incoming data lines but each address decoder is programmed to recognise a specific page address code and will only accept data with that page address code. The memory may consist of 32, for example, data stores providing storage space for 32 pages of data, each page consisting of 24 rows each of which may be randomly accessed.

Data from an external keyboard may be stored and accessed at random in any register. In the proposed transmission system an interval during which keyboard data may be entered and stored exists. This occurs in the first row of any page (designated page header) and the first eight transmitted characters in this row contain page and code addresses that are not intended for display. Their place in the data store may be taken by the keyboard data which may be read out and compared with the incoming transmitted time and page codes, providing a facility for selecting a certain page at a selected time. In addition this keyboard data may be displayed by the display means, since data stored in the first positions of the row will be interpreted and displayed by the display logic, if required.

The data store organisation is suitable for both data capture and display. In a data store associated with a rasterscan display, the data needs to be circulated a number of times to effect display of a row of characters. This is so because the stored data representing a row needs to be circulated each time a line of the raster is scanned, until the row is complete. Because the data in a register of the store is independent of the data in the remainder of the store, and each register is organised for the data to be circulated continuously, the data may be used directly to control a raster-scan display and there is no need for a buffer store.

The independence of storage in each row of the data store also ensures that erroneous data reception in any register has no effect on data storage in other register rows.

Figure 3:
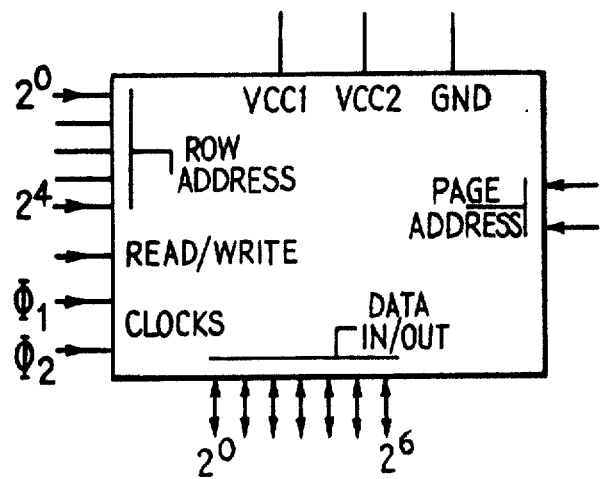
FIG. 3 represents a shift register suitable for implementing the data store of FIG. 1.

FIG. 3 represents diagrammatically one form of shift register suitable for implementing the data store of FIG. 1 or a memory comprising a plurality of data stores. The shift register is adapted to receive seven bits in parallel on the DATA IN/OUT terminals. This has advantages over true serial storage in that read and write times for parallel storage are one-seventh those for serial storage. Clock inputs are provided for controlling the circulation of stored data whenever the READ/WRITE controls are inoperative, and for clocking data in or out when the READ/WRITE controls are operative. The row address decoder and page address decoder are provided as part of the shift register to reduce the number of pins required on the electronic package.

Figure 2:
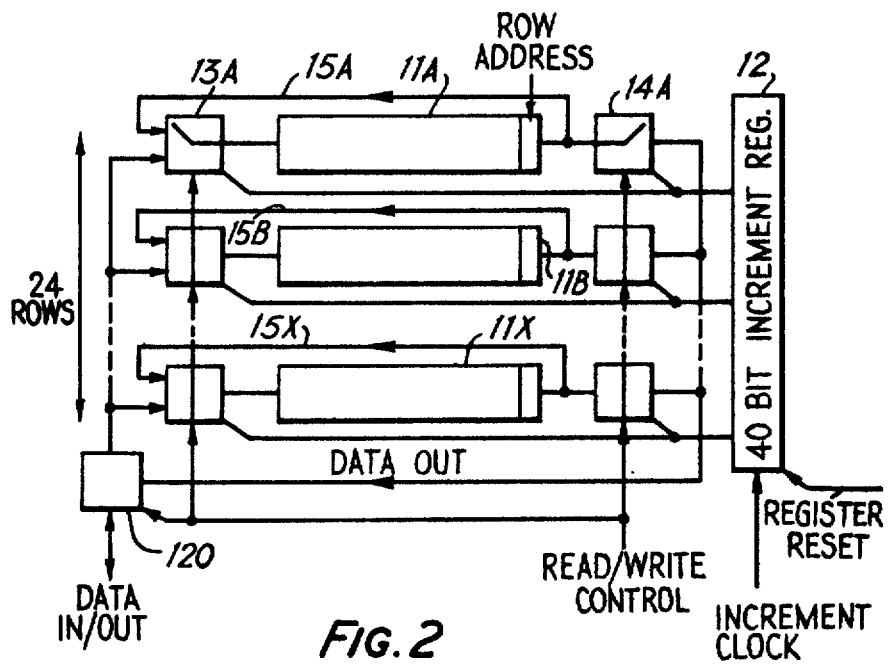
FIG. 2 represents a data store and illustrates three rows of storage capacity the data store having an incrementing register as the first switching means.

Referring now to FIG. 2 there is represented a modified form of data store which is somewhat less flexible than a true random access data store but which is simpler. The modifications illustrated in FIG. 2 result from a consideration of the form of the transmitted data which is row sequential for most of the time. The data store of FIG. 2 is therefore arranged to function most efficiently when all the transmitted rows are in sequence and to suffer somewhat reduced efficiency as the transmissions depart from being truly row sequential. A data store for a page of storage consists of twenty-four shift register stores, each register accepting seven-bit data on parallel lines. Each register has a unique row address which is predetermined, and which is used for comparison with incoming data to determine whether or not the incoming data is to be entered at that address. Incoming data is entered into a register when the register address and the incoming data address are the same. The registers are arranged in address sequence starting with the first row address, and when the incrementing register 12 has been reset the address of incoming data will be compared with the row address of the first register of the data store. If an incoming data address that is the same as the row address of the first register is detected then the data is written into the first register of the data store and on completion the register 12 increments to recognise data having an identical address to that of the second row of data storage. If this row of data is detected it is entered into the second register. Provided that all remaining rows are transmitted in sequence the complete page will be captured by the data store and will be held in circulation ready for display when required. Should an out-of-sequence row be transmitted the incrementing register 12 will wait until the in-sequence transmission occurs and store it, but the out-of-sequence row will be ignored.

If the transmitted data is received with errors in the row address, the register 12 will not be incremented and will fall behind, and will be unable to capture the data that arrives subsequently. This may be overcome by employing an internal time reference which limits the time for which the register 12 is allowed to pause and which is adapted to also increment the register 12 when this period has elapsed. The period for which the register 12 is allowed to pause may correspond to the time required to receive two rows of data. This would permit the data store to remain in synchronism during transmission of a single out-of-sequence row and to continue without difficulty when sequential transmissions are resumed. The time reference would need to advance the register 12 by at least two increments when this action is necessary, resulting in the loss of one row of data. Only one row is lost because the data row with the erroneous address would have been disregarded by a true random access store as well.

A memory comprising a plurality of data stores using incrementing registers may be employed to store a plurality of pages of transmitted data. The memory may be adapted to store up to 32 pages of data or possibly more. The data stores making up the memory are connected in parallel but data is accepted by only one register, this being the register that has been made available by its incrementing register and page address. As each group of registers corresponding to a page is filled, control is passed to the incrementing register controlling the next group of registers corresponding to a page and the address comparison and data storage procedure is repeated. The time interval control which limits the period for which a register is permitted to pause may be extended to limit the time for which any one register is operative, after which control is passed to the register associated with the subsequent page. This helps to reduce the chances of the memory failing to capture data after the transmitted data gets ahead of the capture sequence.

Figure 4:
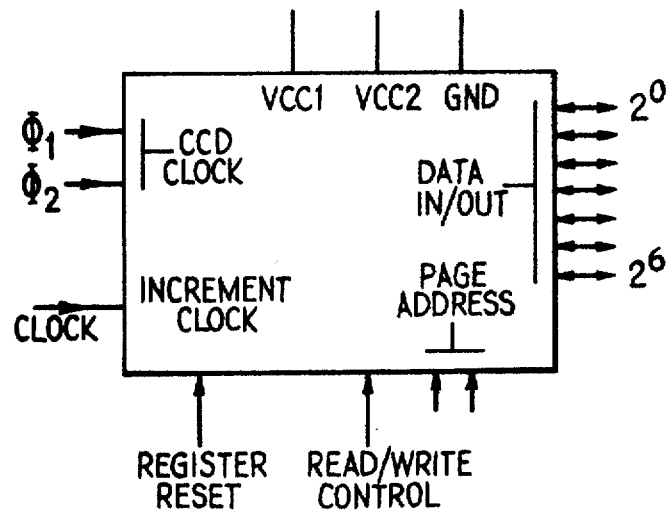
FIG. 4 represents a shift register suitable for implementing the data store of FIG. 2.

FIG. 4 represents a shift register suitable for implementing the data store illustrated in FIG. 2. Data is handled in parallel as seven-bit words to reduce the access time and particularly to permit the use of relatively slow storage devices such as charge-coupled devices. The data held in storage is circulated continuously under the control of the circulation clocking pulses supplied to $\phi_1$ and $\phi_2$, which provides for easy read-out and display since the circulating storage arrangement lends itself readily to display on a raster-scan display. There may be a number of "dummy" characters introduced into a row to occupy the positions being read out while the display is executing line flyback. This avoids the necessity to stop circulation of data between lines. Each register has provision for a page address code which enables a particular page stored in the memory to be selected. This address code may be altered by local control to provide means for preselecting which pages of data are to be stored. This is especially useful in a memory having less capacity than the number of pages required for a full magazine of storage.

Referring again to FIG. 2, for displaying stored data the incrementing register 12 is reset at the beginning of the display field, and data recirculated until the row address held in the addressed register of the store corresponds to that of the external row address counter in the logic of the display control system. The outlet gate 14A then opens and the recirculating data is displayed on a number of lines. After the first row has been displayed the incrementing register 12 is advanced a count to bring the next register in and this row is displayed on a number of lines as the data is recirculated. This is continued in sequence until all the rows have been displayed to provide a page of data.

Figure 5:
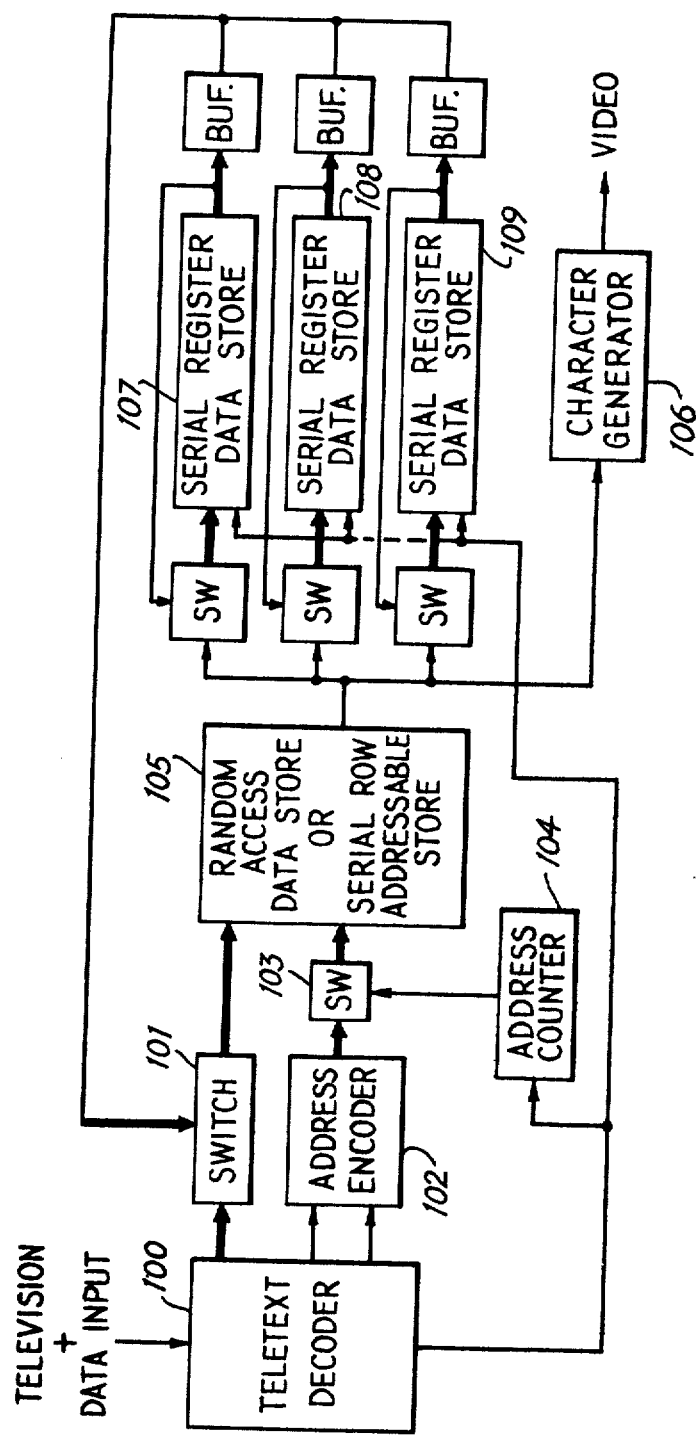
FIG. 5 represents a form of multi-page data store employing one embodiment of the invention as a random access data store for organising the data for serial storage.

FIG. 5 illustrates an alternative system for storing multiple pages of data and employing the now addressable capabilities provided by the data store represented by FIG. 1. This form of multi-page storage is disclosed in U.S. application Ser. No. 31249 filed 12 Oct. 1976 by Robert Parsons for IMPROVED SYSTEM OF DATA STORAGE. That application discloses a data store consisting of a teletext decoder 100, switching means 101, address encoder 102 and associated switch means 103, address counter 104 which together present addressed data and coded addresses to a row addressable memory 105. The addressed data which includes the original address is read into the row addressable memory 105 under the control of the coded addresses via switch means 103. The data presented to the random access data store 105 is read into the registers in the correct sequence and when a page is complete it is displayed on a display monitor via the character generator 106. The page of data in the row addressable data store 105 may then be transferred to a serial register such as register 107 which has sufficient storage capacity to store a page. Data stored in the serial registers is recalled for display via the switch 101 and the random row addressable store 105. Data is then displayed by sequentially addressing the RAM store.

Figure 6:
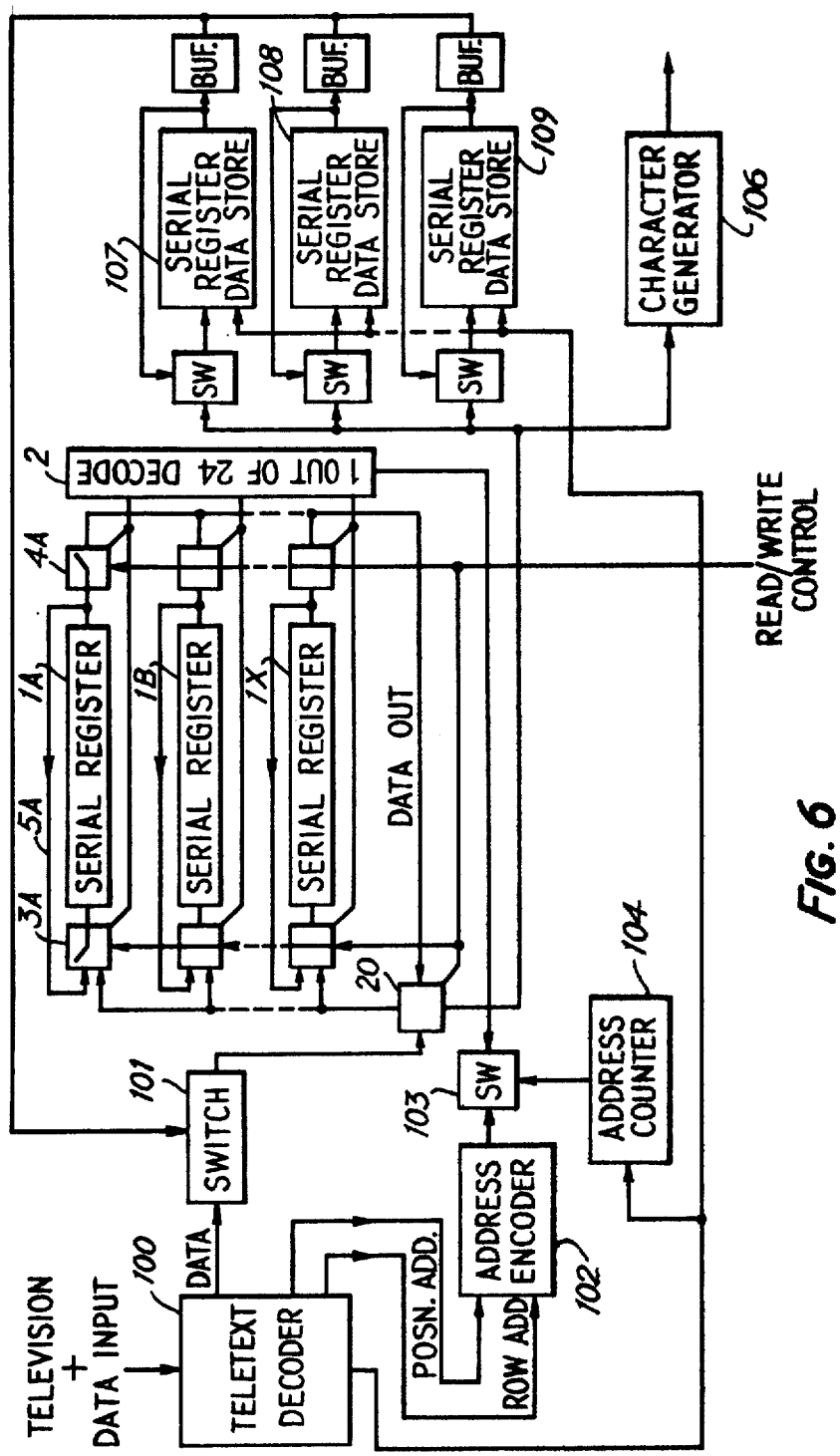
FIG. 6 is a detailed schematic representation of FIG. 5 showing the arrangement of the random access data store in relation to the remainder of the system.

FIG. 6 shows the data store of FIG. 1 introduced as the random access data store referred to in FIG. 5. This system permits the use of serial registers throughout for handling multiple pages of data, the storage means being effected by truly sequential registers which are therefore of simple construction, and the organization of the data for storage and display being handled by a serial register adapted to operate as a random access data store.

What is claimed is:

1. A multi-address digital data store organized for storage of input data cmprising respective multi-row groups of data, said input data comprising a plurality of blocks of data, each block including information digits and an associated group of two-part address code digits, each two-part address code digit comprising a data group identification part and a data row identification part; a plurality of serially accessed data storage register means each corresponding with an individual row of a multi-row data group and uniquely corresponding to a selected one of said two-part address code digits; individual first and second switch means for each said register means; address decode means for independently and individually addressing said shift register means via said first switch means and responsive to said input data two-part address code digits for routing said input data directly to the uniquely corresponding register means to write data into said store and via said second switch means to read data from said store.

2. A data store according to claim 1, said store further including means responsive to manually selectable codes which relate a selected register means to said two-part address digits for causing the data store to respond only to the data group having addresses associated with said selected codes.

3. A data store according to claim 1, wherein each said register means is a parallel bit data storage register means.

4. A data store as claimed in claim 1, wherein said serially accessed register means comprise dynamic storage devices.

5. A data store according to claim 1, wherein said serially accessed register means comprise charge transfer devices.

6. A data store according to claim 1, wherein said serially accessed register means comprise magnetic bubble storage devices.

7. A data store according to claim 1, said decode means responsive to said two-part address digits as data group and row address codes for activating the appropriate one of said first switching means or said second switching means, and data input duplexer circuit means for routing data selectively into or out of said data store.

8. A data store according to claim 7, further including input circuit means for extracting said two-part address code data from a composite signal and for generating data addresses corresponding to the addressed data, and a plurality of sequential storage shift register means for storing data in the sequence in which it is introduced into the sequential storage shift register means, said multi-address digital data store accepting said addressed data and said data addresses from the input circuit means and organizing said addressed data in a plurality of registers in accordance with said data addresses; and means for transferring organized data held in said multi-address digital data store from said data store to said sequential storage shift registers in address sequence.

9. A data store according to claim 8, further including a raster-scan data display monitor and means for reading out data from said data store for display by said monitor.

10. A data store according to claim 1, wherein said decode means comprises incrementing shift register means for activating a selected first switch means to open a data transmission path within said store to said register means corresponding to said selected first switching means, and data input circuit means for comparing address codes of said input data with the address codes of said selected register means for routing the input data to said selected register of the data store when the address codes correspond.

11. In display apparatus including line-by-line raster-scan display means, a multi-address digital data store organized for storage of input data comprising respective multi-row groups of data, said input data comprising a plurality of blocks of data, each block including information digits and an associated group of two-part digits defining an address code, each two-part digit comprising a data group identification and a data row identification part; a plurality of serially accessed dynamic data storage register means for storing parallel bit data, each said register means uniquely corresponding to a selected one of said two-part address digits; means for recirculating data stored in a register means through that said register means; individual first and second switch means for each said register means; address decode means for independently and individually addressing said shift register means via said first switch means to write data into said store and via said second switch means to read data from said store, said decode means comprising incrementing shift register means for activating a selected first switch means to open a data transmission path within said store to the data storage register means corresponding to said selected first switch means and data inut circuit means for comparing said two-part address code of input data on said transmission path with the addrss code of said selected dynamic data storage register means for selectively routing said input data to said selected data storage means when the address codes correspond, and for activating a selected second switch means to open a data transmission path within said store for outputting data from the data storage means corresponding to said selected second switch means.

12. Display apparatus according to claim 11, further including means for selectively extracting stored data from said multi-digit store for display by said display means.

13. Display apparatus according to claim 11, wherein said raster-scan display means comprises display means of a television broadcast receiver including data extraction circuit means for extracting said input data from a composite broadcast signal received by said receiver and for generating data addresses corresponding to the address digits of said input data; and wherein said multi-address digital data store is organized to accept and store said address input data in sequential correspondence with data addresses; a plurality of sequential storage shirt register means for storing data in the sequence in which said data are introduced into said sequential storage shift register means; and means for transferring organized store data from said multi-address digit store to said sequential storage shift register means in addressed sequence.

14. Display apparatus according to claim 13, further including means for alternatively extracting from said multi-digit store or from said sequential storage shift registers, data for display on a line-by-line basis on said display means.

* * * * *